United States Patent

(12) Kuwabara et al.

(10) Patent No.: US 8,026,357 B2
(45) Date of Patent: Sep. 27, 2011

(54) CELLULOSE ACYLATE FILM AND ITS APPLICATIONS

(75) Inventors: Tomoko Kuwabara, Minami-ashigara (JP); Kunihiro Atsumi, Minami-ashigara (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 500 days.

(21) Appl. No.: 12/260,171

(22) Filed: Oct. 29, 2008

(65) Prior Publication Data

US 2009/0111981 A1    Apr. 30, 2009

(30) Foreign Application Priority Data

Oct. 29, 2007    (JP) ................. 2007-280024

(51) Int. Cl.
*C08B 3/00* (2006.01)
*C08B 3/16* (2006.01)
*C08B 13/00* (2006.01)
*C08B 3/06* (2006.01)
*C08B 3/08* (2006.01)
*G02B 5/30* (2006.01)
*G02F 1/1335* (2006.01)

(52) U.S. Cl. ............... 536/63; 536/64; 536/65; 536/66; 536/68; 536/69; 359/489.11; 349/96

(58) Field of Classification Search ................... 536/63, 536/64, 65, 66, 68, 69; 359/489.11; 349/96
See application file for complete search history.

(56) References Cited

U.S. PATENT DOCUMENTS 1,833,270 A * 11/1931 Teupel ...................... 536/66

FOREIGN PATENT DOCUMENTS

| JP | 2000-352620 A | 12/2000 |
| JP | 2006-328298 A | 12/2006 |

* cited by examiner

*Primary Examiner* — Shaojia Anna Jiang
*Assistant Examiner* — Everett White
(74) *Attorney, Agent, or Firm* — Buchanan Ingersoll & Rooney PC

(57) ABSTRACT

A cellulose acylate film, comprising a cellulose acylate having at least one substituent (Substituent A) comprising an aromatic group having at least one C4 or longer aliphatic group, is disclosed.

10 Claims, No Drawings

CELLULOSE ACYLATE FILM AND ITS APPLICATIONS

CROSS-REFERENCE TO RELATED APPLICATIONS

This application claims benefit of priority under 35 U.S.C. 119 to Japanese Patent Application No. 2007-280024 filed on Oct. 29, 2007; and the entire contents of the application are incorporated herein by reference.

BACKGROUND OF THE INVENTION

1. Field of the Invention

The present invention relates to a cellulose acylate film useful as an optical film or the like, and to its applications, more specifically, antireflection film, polarizing plate and an image-displaying device comprising the cellulose acylate film.

2. Related Art

As liquid crystal displaying devices have become more popular, the demand of the market on their displaying qualities and their durability have been more and more increased; and further improvement in terms of response speed and viewing angle properties, such as improvement of contrast and color-balance in oblique directions, has been required. For responding such demands, there has been provided various liquid-crystal modes; and research and development of retardation films, which can optically compensate birefringence of liquid-crystal layers employing such liquid-crystal modes respectively, are needed.

Cellulose acylate films have been widely utilized as polarizer protective films for liquid-crystal displaying devices, as having transparency and toughness. For example, proposed are optical films of fatty acid acyl cellulose esters such as cellulose acetate propionate, cellulose acetate butyrate, etc. (see JPA No. 2000-352620, referred to as Patent document 1). However, these films may have limited optical properties such as Re and Rth, and they may not always function adequately as a retardation film.

Also proposed is an optical film formed of a composition comprising a cellulose ester of mixed aromatic carboxylic acid (see JPA No. 2006-328298, referred to as Patent document 2).

SUMMARY OF THE INVENTION

However, the optical film described in Patent document 2 suffers from variation in retardation depending on humidity-variation, and it causes light-leakage when being used in a liquid crystal displaying device. It also suffers from limitations of Re and Rth due to its difficulty on being subjected to a unidirectional stretching treatment with a high stretching ratio. Therefore, it may not always function adequately as both of a protective film of a polarizing plate and a retardation film.

One object of the present invention is to provide a cellulose acylate film, which can be subjected to a stretching treatment with a high stretching-ratio, showing a reduced retardation-variation depending on humidity-variation; and another object is to provide an antireflection film, polarizing plate and image-displaying device comprising the cellulose acylate film.

The means for achieving the objects are as follows.

[1] A cellulose acylate film comprising a cellulose acylate having at least one substituent (Substituent A) comprising an aromatic group having at least one $C_4$ or longer aliphatic group.

[2] The cellulose acylate film as set forth in [1], being a stretched film.

[3] The cellulose acylate film as set forth in [1] or [2], wherein the cellulose acylate further has at least one aliphatic acyl group (Substituent B).

[4] The cellulose acylate film as set forth in [3], wherein a degree of substitution with Substituent B, DSB, satisfies following relational expression (I):

$$1.70 \leq DSB \leq 2.89. \quad (I)$$

[5] The cellulose acylate film as set forth in [3] or [4], wherein Substituent B is a $C_{2-4}$ aliphatic acyl group.

[6] The cellulose acylate film as set forth in [5], wherein Substituent B is an acetyl group.

[7] The cellulose acylate film as set forth in any one of [1] to [6], being a retardation film.

[8] An antireflection film comprising a cellulose acylate film as set forth in any one of [1] to [7], and an antireflection layer.

[9] A polarizing plate comprising a polarizing film, and two protective films having the polarizing film therebetween, wherein at least one of the two protective films is a cellulose acylate film as set forth in any one of [1] to [7].

[10] An image-displaying device comprising a cellulose acylate film as set forth in any one of [1] to [7].

PREFERRED EMBODIMENT OF THE INVENTION

The invention is described in detail hereinunder.

In this description, the numerical range expressed by the wording "a number to another number" means the range that falls between the former number indicating the lowermost limit of the range and the latter number indicating the uppermost limit thereof.

1. Cellulose Acylate

The cellulose acylate film of the invention comprises a cellulose acylate having at least a substituent (Substituent A) comprising an aromatic group having at least one $C_4$ or longer aliphatic group. Cellulose has free hydroxyl groups at the 2-, 3- and 6-positions per the β-1,4-bonding glucose unit thereof; and Substituent A substitutes any one of hydrogen atoms of free hydroxyl groups at the 2-, 3- and 6-positions. Having Substituent A, the cellulose acylate may show reduced retardation-variation depending on humidity-variation and may be subjected to a unidirectional stretching treatment successfully. Therefore, according to the invention, it is possible to provide various cellulose acylate films, showing not only preferable retardation but also small retardation-variation depending on humidity-variation, by adjusting the stretching ratio of the unidirectional stretching treatment.

1.-1 Substituent A

Substituent A is a substituent comprising an aromatic group having at least one $C_4$ or longer aliphatic group. Substituent A has high polarizability-anisotropy due to presence of the aromatic group. Polarizability-anisotropy, $\Delta\alpha$, is defined as following formula.

$$\Delta\alpha = \alpha_x - (\alpha_y + \alpha_z)/2$$

In the formula, $\alpha_x$ is the largest eigenvalue of diagonalized polarizability tensor; $\alpha_y$ is the second largest eigenvalue of diagonalized polarizability tensor; and $\alpha_z$ is the smallest eigenvalue of diagonalized polarizability tensor.

According to the invention, preferably, polarizability of Substituent A is equal to or more than $2.5 \times 10^{-24}$ cm$^3$. Polarizability-anisotropy of a substituent can be calculated by using Gaussian 03 (Revision B.03, a software provided by Gaussian, inc.). More specifically, polarizability-anisotropy is calculated as follows. A geometry optimization is performed using the B3LYP/6-31G*; then, calculation of polarizability-anisotropy is performed using B3LYP/6-311+G**; diagonalization of the obtained polarizability tensor is performed; and, finally, polarizability-anisotropy is derived from the diagonal components.

"Aromatic" is defined as an aromatic compound in Dictionary of Physics and Chemistry (by Iwanami Publishing), 4th ed., p. 1208; and the term "aromatic group" in the description is used for any aromatic hydrocarbon groups and any aromatic heterocyclic groups. The aromatic group is preferably an aromatic hydrocarbon group.

The aromatic hydrocarbon group preferably has from 6 to 24 carbon atoms, more preferably from 6 to 12 carbon atoms, and even more preferably from 6 to 10 carbon atoms. Specific examples of the aromatic hydrocarbon group include a phenyl group, a naphthyl group, an anthryl group, a biphenyl group and a terphenyl group; and more preferred are a phenyl group, naphthyl group and biphenyl group; and even more preferred is a phenyl group.

The aromatic heterocyclic group preferably has at least one selected from the group consisting of an oxygen atom, a nitrogen atom and a sulfur atom. Specific examples of the heterocyclic group include those derived from furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzthiazole, benzotriazole and tetrazaindene. The aromatic heterocyclic group is especially preferably a pyridyl group, a triazinyl group or a quinolyl group.

In the embodiments wherein the aromatic group comprises two or more aromatic rings, at least one of the aromatic rings has the aliphatic group.

The aromatic group has at least one $C_4$ or longer aliphatic group. When the number of carbon atoms in the aliphatic group is less than 4, the effect of reducing retardation-variation may not be obtained. In terms of reducing retardation-variation depending on humidity-variation, the aliphatic group having more number of carbon atoms is more preferable; on the other hand, in terms of strength of the film, the aliphatic group having more number of carbon atoms is not more preferable since the glass transition is lowered. In these viewpoints, the number of carbon atoms in the aliphatic group is preferably from 4 to 18, and more preferably from 6 to 12. It is to be noted that the term "aliphatic" should be most broadly interpreted in the description; and the term is used for any non-aromatic hydrocarbon groups. Accordingly, the term is used for any linear, branched and cyclic aliphatic groups, and even for any aliphatic groups having un-saturated bonding(s) so far as the groups show non-aromaticity. The aliphatic group may have hetero atom(s) other than hydrogen atom therein. Among those, aliphatic groups having a chain structure are preferable, and aliphatic groups having a linear chain structure are more preferable. Preferable examples of the aliphatic group include $C_4$ or longer alkyls, alkoxys, acyls and alkylamines; among these, $C_4$ or longer alkyls and alkoxys are more preferable.

The aromatic group may have two or more aliphatic groups which are same or different from each other. The aromatic group may have other substituent (s) along with the $C_4$ or longer aliphatic group, and preferably, the aromatic group doesn't have any other substituent(s) along with the $C_4$ or longer aliphatic group.

Preferably, Substituent A is an acyl group substituting any one of hydrogen atoms of free hydroxyl groups at the 2-, 3- and 6-positions. Such the acyl group, Substituent A, may have a linking group between the aromatic group and the acyl group; and examples of the linking group include $C_{1-10}$ (more preferably $C_{1-6}$ and even more preferably $C_{1-4}$) alkynylene and alkenylene groups. However, preferably, Substituent A is a substituent in which an acyl group combines to the aromatic group directly; and Substituent A is preferably selected from the substituent represented by formula (A).

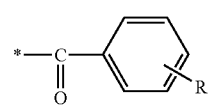

(A)

In formula (A), R represents a $C_4$ or longer aliphatic group; and * indicates a site combining to 2-, 3- or 6-position oxygen atom.

Preferably, R represents $C_{4-18}$ (more preferably $C_{6-12}$) alkyl or alkoxy group. Examples of R include butyl, butoxy, butyl amino, pentyl, pentoxy, hexyl, hexyloxy, heptyl, heptoxy, nonyl, nonyloxy, dodecyl, dodecyloxy, octyl, octyloxy and undecyloxy.

In terms of reducing retardation-variation depending on humidity-variation, the aliphatic group having more number of carbon atoms is more preferable, compared with the same types of aliphatic group having less number of carbon atoms. The aliphatic group without hetero atom (such as an alkyl group) is more preferable, compared with the aliphatic group, having the same number of carbon atoms, with at least one hetero atom.

The substituting position of the aliphatic group, R, is not limited to any position, and is preferably the para-position with respect to the acyl group.

1.-2 Substituent B

The cellulose acylate may have at least one substituent, Substituent B, other than Substituent A along with Substituent A.

Substituent B is preferably an aliphatic acyl group having a linear-chain, branched-chain or cyclic structure. The aliphatic acyl group may have unsaturated bonding(s) therein. Preferably, Substituent B is a $C_{2-20}$ (more preferably $C_{2-10}$, and even more preferably $C_{2-4}$) aliphatic acyl group. Preferable examples of Substituent B include acetyl, propionyl and butyryl; and acetyl is especially preferable. By using the cellulose acylate having acetyl as Substituent B, a cellulose acylate film having an appropriate glass transition point (Tg) and an appropriate coefficient of elasticity is obtainable. The aliphatic acyl group, having small number of carbon atoms, such as acetyl, may contribute to providing a cellulose acylate film having an appropriate strength without lowering film's Tg and coefficient of elasticity.

1.-3 Degree and Position of substitution

According to the invention, the cellulose acylate having any degree of substitution with Substituent A may be used. In terms of obtaining the effect of Substituent A, the higher degree of substitution with Substituent A is more preferable; however, in terms of film-forming and film strength, a certain degree of substitution with Substituent B is preferable. In the invention, cellulose acylates wherein hydrogen atoms of almost all of 2-, 3- and 6-positions hydroxyls are substituted with Substituent A and B, are preferable; and cellulose acylates wherein the sum of the degrees of substitution with Substituent A and B is 3, or in other words, wherein hydrogen atoms of all of 2-, 3- and 6-positions hydroxyls are substituted with Substituent A and B, may be used. The sum of the degrees of substitution with Substituent A and B is preferably from 2.2 to 3, and more preferably from 2.5 to 3. For obtaining the effect of reducing retardation-variation depending on humidity-variation without lowering film-forming and film-strength, preferably, the degree of substitution with Substituent A, DSA, is from 0.2 to 0.85 around, and the degree of substitution with Substituent B, DSB, is from 1.70 to 2.89 around; more preferably, DSA is from 0.35 to 0.85 around and DSB is from 1.70 to 2.45 around.

According to the invention, the cellulose acylate having Substituent A at any position may be used. By using the cellulose acylate wherein the position and/or degree of substitution with Substituent A is adjusted, a cellulose acylate film, having retardation falling within the desired range, can be produced. The relation between the degree and position of substitution with Substituent A and optical properties of the film to be obtained will be explained below. It is to be noted that the substitution degree with Substituent A at the 2-, 3- and 6-positions of cellulose is referred to as DSA2, DSA3 and DSA6, hereinafter.

For producing the film having large retardation Re, the cellulose acylate, satisfying DSA2+DSA3−DSA6≧−0.15, or DSA2+DSA3−DSA6≦−0.35, is preferably used.

For producing the film having retardation (Re) of equal to or less than 50 nm, the cellulose acylate, satisfying 0.25≦DSA2+DSA3−DSA6<−0.1 and having DSA6 of 1.8 to 2.5 around, is preferably used.

For producing the film having positive retardation along thickness direction (Rth), the cellulose acylate, satisfying DSA2+DSA3−DSA6≦−0.20, is preferably used.

For producing the film having negative retardation along thickness direction (Rth), the cellulose acylate, satisfying −0.10≦DSA2+DSA3−DSA6, is preferably used. For producing the film having a large absolute value of negative Rth, more specifically, for producing the film having Rth of equal to or less than −150 nm, the cellulose acylate, satisfying 0.15≦DSA2+DSA3−DSA6 and having DSA6 of 1.8 to 2.5 around, is preferably used.

In the invention, the substitution degree and the distribution of the substitution degree may be determined according to the method described in Cellulose Communication 6, 73-79 (1999), and Chirality 12(9), 670-674, through $^1$H-NMR or $^{13}$C-NMR.

For the starting material cotton for cellulose acylate, usable is not only natural cellulose such as cotton linter and wood pulp (broad-leaved tree pulp, coniferous tree pulp), but also cellulose having a low degree of polymerization (degree of polymerization of from 100 to 300) that is obtained through acid hydrolysis of wood pulp, such as microcrystalline cellulose; and as the case may be their mixture may also be used. The details of the starting material cellulose are described, for example, in "Plastic Material Lecture (17), Cellulosic Resin" (written by Marusawa, Uda, published by Nikkan Kogyo Shinbun-sha, 1970); Hatsumei Kyokai Disclosure Bulletin 2001-1745 (pp. 7-8); and "Encyclopedia of Cellulose (p. 523)" (edited by the Society of Cellulose of Japan, published by Asakura Shoten, 2000). Cellulose described in these references can be used herein, to which, however, the invention should not be limited.

Cellulose acylate which can be used in the invention may be prepared, for example, by reacting Aldrich's cellulose acylate (having a degree of acetyl substitution of 2.45) or Daicel's cellulose acetate (having a degree of acetyl substitution of 2.41 (tradename, L-70), or 2.15 (trade name, FL-70), which is a starting material, with a corresponding acid chloride. In general, starting from a cellulose acetate in which the hydroxyl groups are partly substituted with an acetyl group, it may be reacted with an acid chloride such as 4-heptylbenzoyl chloride so as to introduce Substitution A thereinto, and Substitution A may be predominantly introduced into the 6-position. For obtaining a cellulose acylate having Substitution A predominantly introduced into the 2- and 3-positions, cellulose acetate is once deacetylated under a basic condition so as to predominantly remove the 2- and 3-positioned acetyl groups, and thereafter it is acylated with an acid chloride, thereby obtaining a cellulose acylate having Substitution A predominantly introduced into the 2- and 3-positions and having the acetyl group remaining essentially at the 6-position as a substituent B. The deacetylation may be attained, for example, in the presence of amine and water. By controlling the degree of acetyl substitution of the starting material cellulose acetate, the condition in deacetylation and the condition for substituent A introduction, a desired cellulose acylate may be produced.

Not specifically defined, the viscosity-average degree of polymerization of the cellulose acylate is preferably from 300 to 700, more preferably from 350 to 500, even more preferably from 400 to 500. When the polymer has a mean degree of polymerization of at most 700, then the viscosity of the cellulose acylate dope may not be too high and the film formation with the dope by casting may be easy. When the polymer has a degree of polymerization of at least 300, it is favorable since the intensity of the film formed of it may increase. The mean degree of polymerization may be measured, for example, according to an Uda et al's limiting viscosity method (Kazuo Uda, Hideo Saito; the Journal of the Society of Fiber Science and Technology of Japan, Vol. 18, No. 1, pp. 105-120, 1962). Concretely, it may be measured according to the method described in JPA No. hei 9-95538.

2. Cellulose Acylate Film

The cellulose acylate film of the invention preferably contains the above-mentioned cellulose acylate in an amount of equal to or more than 50% by mass, more preferably in an amount of equal to or more than 80% by mass, and even more preferably in an amount of equal to or more than 95% by mass.

The film of the invention can be prepared by using a composition comprising the cellulose acylate described above. The composition may be in any form such as particle form, powder form, fibrous form, massive form, dissolved form, and melted form. The composition in particle or powder form is preferable. In terms of homogenizing the particle size and improving the handling, the cellulose acylate composition is preferably subjected to a pulverization-treatment or a sifting treatment after drying.

In the invention, single type of the cellulose acylate may be used, or two or more types of the cellulose acylates may be used in combination. The composition may comprise polymer(s) other than cellulose acylates, and/or one or more additives along with the cellulose acylate. The ingredient(s) to be added to the composition is preferably selected from any materials easily compatible with the cellulose acylate, so that the transparency of the film to be formed of the composition is preferably equal to or more than 80%, more preferably equal to or more than 90%, and even more preferably equal to or more than 92%.

In the invention, various additives generally applicable to cellulose acylate (for example, UV inhibitor, plasticizer, antioxidant, fine particles, optical characteristics controlling agents) may be added to the cellulose acylate composition. Regarding the time at which the additives are added to the cellulose acylate, they may be added at any time in the process of dope preparation, or may be added in the final step of the dope preparation process.

The production method for the cellulose acylate film of the invention is not specifically defined. Preferably, the film is produced according to a melt casting process or a solvent casting process to be described below. More preferred is a solvent casting process. Both the melt casting process and the solvent casting process may produce the cellulose acylate film of the invention like ordinary processes. For example, for melt casting film formation, referred to is JPA No. 2006-348123; and for solvent casting film formation, referred to is JPA No. 2006-241433.

2.-1 Solvent Casting Film Formation

Preferred embodiments of solvent casting film formation for the cellulose acylate film of the invention are described below.

In the solvent casting process, a solution of cellulose acylate is first prepared, and then the solution is cast on the surface of a support and formed into a film thereon. The solvent to be used in preparing the cellulose acylate solution is not specifically defined. Preferred solvents are chlorine-containing organic solvents such as dichloromethane, chloroform, 1,2-dichloroethane, tetrachloroethane, and chlorine-free organic solvents. The chlorine-free organic solvents are preferably selected from esters, ketones and ethers having from 3 to 12 carbon atoms. The esters, the ketones and the ethers may have a cyclic structure. Compounds having two or more functional groups of esters, ketones and ethers (i.e., —O—, —CO— and —COO—) are also usable herein as a main solvent; and they may have any other functional group such as an alcoholic hydroxyl group. In case where the main solvent has two or more functional groups, the number of the carbon atoms constituting them may fall within a range of the number of carbon atoms that constitute the compound having any of those functional groups. Examples of the esters having from 3 to 12 carbon atoms are ethyl formate, propyl formate, pentyl formate, methyl acetate, ethyl acetate, pentyl acetate. Examples of the ketones having from 3 to 12 carbon atoms are acetone, methyl ethyl ketone, diethyl ketone, diisobutyl ketone, cyclopentanone, cyclohexanone, methylcyclohexanone. Examples of the ethers having from 3 to 12 carbon atoms are diisopropyl ether, dimethoxymethane, dimethoxyethane, 1,4-dioxane, 1,3-dioxolane, tetrahydrofuran, anisole and phenetole. Examples of the organic solvents having plural functional groups are 2-ethoxyethyl acetate, 2-methoxyethanol, 2-butoxyethanol.

In preparing the cellulose acylate solution, it is desirable that cellulose acylate is dissolved in an organic solvent to a degree of from 10 to 35% by mass, more preferably from 13 to 30% by mass, even more preferably from 15 to 28% by mass. In order to dissolve the cellulose acylate in the organic solvent to prepare a solution having the concentration that falls within the range, for example, employable is a method of dissolving it to have a desired concentration in the dissolution step, or a method of first preparing a low-concentration solution (for example, having a concentration of from 9 to 14% by mass) and then concentrating it into a high-concentration solution in the subsequent concentration step. Apart from these, also employable is a method comprising first preparing a high-concentration cellulose acylate solution and then adding various additives thereto to convert it into a low-concentration cellulose acylate solution having a predetermined low concentration.

The cellulose acylate solution, dope, may be prepared according to any dissolution method such as dissolution at room temperature, under cooling or heat, and any combinations thereof. Such methods are described in JPA Nos. hei 5-163301, syo 61-106628, syo 58-127737, hei 9-95544, hei 10-95854, hei 10-45950, 2000-53784, hei 11-322946, hei 11-322947, hei 2-276830, 2000-273239, hei 11-71463, hei 04-259511, 2000-273184, hei 11-323017 and hei 11-302388; and they can be used in the invention. The details of the treatment are described in Hatsumei Kyokai Disclosure Bulletin (No. 2001-1745, published on Mar. 15, 2001 by the Hatsumei Kyokai), p. 22-25. In the process of preparing the cellulose acylate solution, it may be concentrated or filtered. The details of the treatment are described in Hatsumei Kyokai Disclosure Bulletin (No. 2001-1745, published on Mar. 15, 2001 by the Hatsumei Kyokai), p. 25. When the polymer is dissolved at high temperatures, then the dissolving temperature is not lower than the boiling point of the organic solvent used in most cases, and in those cases, the system may be processed under pressure.

Regarding the method and the equipment for producing the cellulose acylate film of the invention, any conventional solvent casting film formation methods and solvent casting film formation devices used for producing conventional cellulose acylate films are usable in the invention. A dope (cellulose acylate solution) prepared in a dissolver (tank) is once stored in a storage tank, in which the dope is degassed to be a final dope. The dope is fed into a pressure die from the dope discharge port of the tank, via a metering pressure gear pump through which a predetermined amount of the dope can be fed with accuracy, for example, based on the controlled revolution thereof, and then the dope is uniformly cast onto the metal support of a casting unit that runs endlessly, via the slit of the pressure die. Then, at a peeling point at which the metal support reaches almost after having traveled round, a semi-dried dope film (this may be referred to as a web) is peeled from the metal support. Clipped at its both ends by clips to keep its cross width as such, the resulting web is dried while being conveyed with a tenter, then transported with rolls in the drying device, and after having thus dried, it is wound up with a winder to a predetermined length. The combination of the tenter and the drying device with rolls may be varied depending on the object of the method. In solvent-casting film formation for silver halide photographic materials or functional protective films for electronic displays, additional coating devices may be added to the solvent casting film formation device, for surface processing of the films for forming an undercoat layer, an antistatic layer, an antihalation layer and a protective layer thereon. The processing steps are described in detail in Hatsumei Kyokai Disclosure Bulletin (No. 2001-1745, published on Mar. 15, 2001 by the Hatsumei Kyokai), pp. 25-30, as grouped into casting (including co-casting), metal support, drying, peeling, and stretching.

The cellulose acylate film of the invention, thus produced according to the melt casting process or the solvent casting process mentioned above, may be stretched. A unidirectional (monoaxial) stretching treatment can be carried out on the cellulose acylate film of the invention; and, by adjusting the stretching ratio in the treatment, it is possible to obtain the cellulose acylate film having desired Re.

During the film formation process, the film may be stretched in an on-line mode, or after the film has been formed, it may be once wound up and then stretched in an off-line mode. Specifically, in the melt casting process, the film formed may be stretched before or after it has been completely cooled.

Preferably, the film is stretched at a temperature falling between Tg and (Tg+50° C.), more preferably between (Tg+1° C.) and (Tg+30° C.), even more preferably between (Tg+2° C.) and (Tg+20° C.). Also preferably, the stretching ratio for the stretching is from 0.1 to 500%, more preferably from 10 to 300%, even more preferably from 30 to 200%. The stretching may be carried out in one stage or in multiple stages. The stretching ratio may be obtained according to the following formula:

Stretching Ratio (%)=100×{(length after stretching)−(length before stretching)}/(length before stretching).

The stretching may be carried out according to a machine-direction stretching, transverse-direction stretching or their combination. Examples of the machine-direction stretching includes (1) roll stretching (using at least two pairs of nip rolls of which the speed of the roll on the take-out side is kept higher, the film is stretched in the machine direction, such stretching is usually called "free-edge stretching"), (2) fixed-edge stretching (both edges of the film are fixed, and the film is stretched by conveying it in the machine direction gradually at an elevated speed in the machine direction). The transverse-direction stretching may be tenter stretching (both edges of the film are held with a chuck, and the film is expanded and stretched in the transverse direction (in the direction perpendicular to the machine direction)). The machine-direction stretching and the transverse-direction stretching may be carried out either alone (monoaxial stretching) or may be combined (biaxial stretching). In the biaxial stretching, the machine-direction stretching and the transverse-direction stretching may be effected successively (successive stretching) or simultaneously (simultaneous stretching).

Both in the machine-direction stretching and the transverse-direction stretching, the stretching speed is preferably from 10%/min to 10000%/min, more preferably from 20%/min to 1000%/min, even more preferably from 30%/min to 800%/min. In the multi-stage stretching, the stretching speed is the mean value of the stretching speed in each stage.

After thus stretched in the manner as above, it is desirable that the film is relaxed in the machine direction or in the transverse direction by from 0% to 10%. Further, after thus stretched, it is also desirable that the film is thermally fixed at 150° C. to 250° C. for 1 second to 3 minutes.

After thus stretched, the thickness of the film is preferably from 10 to 300 µm, more preferably from 20 µm to 200 µm, even more preferably from 30 µm to 100 µm.

Preferably, the angle θ formed by the film-traveling direction (machine direction) and the slow axis of Re of the film is nearer to 0°, +90° or −90°. Concretely, in machine-direction stretching, the angle is preferably nearer to 0°, more preferably to 0±3°, even more preferably to 0±2°, still more preferably to 0±1°. In transverse-direction stretching, the angle is preferably 90±3° or −90±3°, more preferably 90±2° or −90±2°, even more preferably 90±1° or −90±1°.

In case where the film has Re owing to the tension applied in the machine direction thereto during the process of casting to peeling the film, its Re may be made to be near to 0 (zero) by stretching the film in the transverse direction with a tenter. In this case, the preferred draw ratio is from 0.1 to 20%, more preferably from 0.5 to 10%, even more preferably from 1 to 5%.

The stretching treatment may be effected during the film formation process; or after the unstretched film is once rolled up, it may be stretched. In the former case, the film may be stretched while it still contains the solvent remaining therein, and the film may be favorably stretched when the remaining solvent content is from 2 to 30% by mass.

The preferred thickness of the dried cellulose acetate film may vary, depending on the use and the object of the film; and, in general, preferably, it is within a range of from 5 to 500 µm, more preferably within a range of from 20 to 300 µm, even more preferably within a range of from 30 to 150 µm. For optical use, especially for VA liquid-crystal displaying devices, the film thickness is preferably from 40 to 110 µm. The film thickness may be controlled to be a desired one, by controlling the solid content of the dope, the slit distance of the spinneret of the die, the extrusion pressure through the die and the speed of the metal support.

The cellulose acylate film of the invention may be formed as a long continuous film. For example, it may be formed as a roll of long continuous film having a width of from 0.5 to 3 m (preferably from 0.6 to 2.5 m, more preferably from 0.8 to 2.2 m) and a length per roll of from 100 to 10000 m (preferably from 500 to 7000 m, more preferably from 1000 to 6000 m). In winding up to a roll, the film is preferably knurled at least on one edge thereof, and the knurling width is preferably from 3 mm to 50 mm, more preferably from 5 mm to 30 mm, and the knurling height is preferably from 0.5 to 500 µm, more preferably from 1 to 200 µm. This may be attained by one-side pressing or both-side pressing.

The above-mentioned, unstretched or stretched cellulose acylate film may be used either alone or as combined with a polarizer; and a liquid-crystal layer or a layer having a controlled refractivity (low-refractivity layer) or a hard coat layer may be provided on it for use herein.

3. Properties of Cellulose Acylate Film

3.-1 Optical Property

In the description, $Re(\lambda)$ and $Rth(\lambda)$ each indicate the in-plane retardation (unit: nm) and the thickness direction retardation (unit: nm) at a wavelength λ. $Re(\lambda)$ is measured by applying a light having a wavelength of λ nm in the normal line direction of a sample of a film, using KOBRA-21ADH or WR (by Oji Scientific Instruments).

When the film to be tested is represented by an uniaxial or biaxial refractive index ellipsoid, then its $Rth(\lambda)$ is calculated according to the method mentioned below.

With the in-plane slow axis (determined by KOBRA 21ADH or WR) taken as the inclination axis (rotation axis) of the sample (in case where the sample has no slow axis, the rotation axis of the sample may be in any in-plane direction of the sample), $Re(\lambda)$ of the sample is measured at 6 points in all thereof, up to +50° relative to the normal line direction of the sample at intervals of 10°, by applying a light having a wavelength of λ nm from the inclined direction of the sample.

With the in-plane slow axis from the normal line direction taken as the rotation axis thereof, when the sample has a zero retardation value at a certain inclination angle, then the symbol of the retardation value of the sample at an inclination angle larger than that inclination angle is changed to a negative one, and then applied to KOBRA 21ADH or WR for computation.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (11) and (12):

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (11)$$

$$Rth = \{(nx+ny)/2 - nz\} \times d \quad (12)$$

wherein $Re(\theta)$ means the retardation value of the sample in the direction inclined by an angle θ from the normal line direction; nx means the in-plane refractive index of the sample in the slow axis direction; ny means the in-plane refractive index of the sample in the direction vertical to nx; nz means the refractive index of the sample vertical to nx and ny; and d is a thickness of the sample.

When the sample to be tested can not be represented by a monoaxial or biaxial index ellipsoid, or that is, when the sample does not have an optical axis, then its Rth(λ) may be calculated according to the method mentioned below.

With the in-plane slow axis (determined by KOBRA 21ADH or WR) taken as the inclination axis (rotation axis) of the sample, Re(λ) of the sample is measured at 11 points in all thereof, from −50° to +50° relative to the normal line direction of the sample at intervals of 10°, by applying a light having a wavelength of λ nm from the inclined direction of the sample. Based on the thus-determined retardation data of Re(λ), the mean refractive index and the inputted thickness of the sample, Rth(λ) of the sample is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

Re and Rth of the cellulose acylate film of the invention may be controlled by adjusting the total degree of substitution, the distribution of the degree of substitution with Substituent A at the 2-, 3- and 6-position, and the stretching ratio in the stretching step. The cellulose acylate film of the invention is subjected to a unidirectional stretching treatment successfully; and Re and Rth of the cellulose acylate film of the invention can be adjusted to the desired ranges by controlling the stretching ratio in the treatment.

Concretely, according to the invention, the cellulose acylate film having Re of from 0 to 500 nm around can be provided. According to the invention, the cellulose acylate film having Rth of from −300 to 300 nm around can be provided. However, the invention should not be limited to these embodiments.

Substituent A in the cellulose acylate film may contribute to reducing Re- and Rth-variation, ΔRe and ΔRth, on humidity-variation. In the description, ΔRe is defined as difference between Re values at 590 nm which are measured at 25° C. and 80% RH and at 25° C. and 10% RH respectively; and ΔRth is defined as difference between Rth values at 590 nm, which are measured at 25° C. and 80% RH and at 25° C. and 10% RH respectively. And, according to the invention, ΔRth and ΔRe of equal to or less than 20 nm can be achieved. Preferably, ΔRth and ΔRe of the film is equal to or less than 15 nm, and most preferably 0 nm.

It is to be noted that measurement of ΔRth or ΔRe is carried out on a sample film after the sample film is left for 4 hours in the atmosphere of the predetermined conditions.

The fluctuation of Re(590) of the film in the transverse direction is preferably ±5 nm, more preferably ±3 nm. The fluctuation of Rth(590) of the film in the transverse direction is preferably ±10 nm, more preferably ±5 nm. Also preferably, the fluctuation of Re and Rth of the film in the machine direction is within the range of the fluctuation thereof in the transverse direction.

3.-2 Equilibrium Water Content of Cellulose Acylate Film

The water content of the cellulose acylate film of the invention may be determined as follows: A sample of the film, 7 mm×35 mm is analyzed using a water content meter and a sample drier (Aquacounter AQ-200, LE-20S, both by Hiranuma Sangyo), according to a Curl-Fisher method. The water content (g) is divided by the mass (g) of the sample to obtain the equilibrium water content of the film.

The equilibrium water content of the cellulose acylate film of the invention is preferably from 0 to 3% at 25° C. and 80% RH, more preferably from 0.1 to 2%, even more preferably from 0.3 to 1.5%. The film having an equilibrium water content of more than 3% is unfavorable because retardation-variation depending on humidity-variation tends to be large.

3.-3 Haze of Cellulose Acylate Film

Preferably, the haze of the cellulose acylate film, as measured with a haze meter (1001DP Model by Nippon Denshoku), is from 0.1 to 0.8, more preferably from 0.1 to 0.7, even more preferably from 0.1 to 0.6. When the haze of the film is controlled to fall within the range and when the optical compensation film comprising it is incorporated in a liquid-crystal displaying device, then the device may give high-contrast images.

3.-4 Photoelasticity Coefficient of Cellulose Acylate Film

The cellulose acylate film of the invention is preferably used as a protective film for polarizing plate or as a retardation plate. In case where the film is used as a protective film for polarizing plate or as a retardation plate, then its birefringence (Re, Rth) may vary owing to its expansion through moisture absorption or to its stress through shrinkage. The birefringence change through stress of the film may be determined as the photoelasticity coefficient thereof, and its range is preferably from $5 \times 10^{-7}$ (cm²/kgf) to $30 \times 10^{-7}$ (cm²/kgf), more preferably from $6 \times 10^{-7}$ (cm²/kgf) to $25 \times 10^{-7}$ (cm²/kgf), even more preferably from $7 \times 10^{-7}$ (cm²/kgf) to $20 \times 10^{-7}$ (cm²/kgf).

3.-5 Surface Treatment of Cellulose Acylate Film

The unstretched or stretched cellulose acylate film may be optionally subjected to surface treatment to thereby improve the adhesiveness between the cellulose acylate film and various functional layers (e.g., undercoat layer, back layer) adjacent thereto. The surface treatment is, for example, glow discharge treatment, UV irradiation treatment, corona treatment, flame treatment, or acid or alkali treatment.

4. Applications of Cellulose Acylate Film

The cellulose acylate film of the invention may be used in various applications. Some of the applications will be described in detail, but they are not limited to those describe below.

4.-1 Retardation Film

The cellulose acylate film may be used as a retardation film. The retardation film may be used in a liquid crystal displaying device, employing any mode, as an optical compensation film or a protective film of a polarizing plate.

The cellulose acylate film of the invention is combined with functional layers described in detail in Hatsumei Kyokai Disclosure Bulletin (No. 2001-1745, published on Mar. 15, 2001 by the Hatsumei Kyokai), pp. 32-45. Above all, it is desirable that the film is provided with a polarizing layer (for polarizer), an optical compensatory layer (for optical compensation film) and an antireflection layer (for antireflection film).

4-2. Optical Compensation Film

The cellulose acylate film of the invention may be used as an optical compensation film of a liquid crystal display. One example of the optical compensation film is that comprising the cellulose acylate film, and an optically anisotropic layer containing aligned liquid crystal composition disposed in the film. The optical compensation film may be used in a liquid crystal displaying device for optical compensation. For example, it may be used for compensating birefringence of a liquid crystal cell in the black state. In the embodiment, Re and/or Rth of the cellulose acylate film or Re and/or Rth of the optically anisotropic layer disposed thereon may be utilized for optical compensation.

Examples of liquid crystal compound used for preparing the optically anisotropic layer include rod-like liquid crystal compounds and discotic liquid crystal compounds. The liquid crystal compound may be selected from high-molecular weight or low-molecular weight liquid crystal materials and even include the materials having no liquid-crystallinity after being settled in an alignment state via cross-linking. The discotic liquid crystal compound may be prepared according to the method described in JPA No. hei 8-50206; and the rod-like liquid crystal compound may be prepared according to the method described in JPA No. 2002-62427.

4.-3 Antireflection Film

The invention also relates to an antireflection film comprising the cellulose acylate film of the invention and an antireflection layer. The antireflection film may be produced according to ordinary production methods, and for example, it may be produced with reference to JPA No. 2006-241433.

5. Polarizing Plate

The invention also relates to a polarizing plate comprising a polarizing film and two protective films sandwiching the polarizing film between them, in which at least one of the two protective films is the cellulose acylate film of the invention. The cellulose acylate film of the invention may be stuck to the polarizing film as a part of the optically-anisotropic layer-having optical compensation film to be stuck thereto or as a part of the antireflection layer-having antireflection film thereto. In case where the polarizing plate has any other layer, it is desirable that the surface of the cellulose acylate film of the invention is stuck to the surface of the polarizing film. For example, the polarizing plate may be fabricated with reference to JPA No. 2006-241433.

6. Image Displaying Device

The invention also relates to an image displaying device comprising at least one cellulose acylate film of the invention. In the displaying device, the cellulose acylate film of the invention serves as a retardation film or an optical compensation film, or as a part of a polarizing plate or an antireflection film therein.

6.-1 Liquid-Crystal Displaying Device

The cellulose acylate film of the invention is favorably used in a liquid-crystal displaying device as a retardation film or as a part of a polarizing plate, an optical compensation film or an antireflection film comprising a cellulose acylate film therein. Examples of the liquid-crystal displaying device include TN-mode, IPS-mode, FLC-mode, AFLC-mode, OCB-mode, STN-mode, ECB-mode, VA-mode and HAN-mode displaying devices; and preferred is an IPS-mode device. The cellulose acylate film of the invention may be favorably used in any of transmissive-type, reflective-type or transflective-type liquid-crystal displaying devices.

(TN-Mode Liquid Crystal Displaying Device)

The cellulose acylate film of the present invention may be used as a support of an optical compensation sheet for a TN-mode liquid crystal displaying device having a TN-mode liquid crystal cell. The TN-mode liquid crystal cell and the TN-mode liquid crystal displaying device have been known. An optical compensation sheet used for the TN-mode liquid crystal displaying device may be produced according to the methods described in JPA Nos. H3-9325, H6-148429, H8-50206 and H9-26572, or published papers by Mori et al., (Jpn. J. Appl. Phys., Vol. 36 (1997), p. 143 and Jpn. J. Appl. Phys., Vol. 36 (1997), p. 1068).

(STN-Mode Liquid Crystal Displaying Device)

The cellulose acylate film of the present invention may be used also as a support of an optical compensation sheet for an STN-mode liquid crystal displaying device having an STN-mode liquid crystal cell. Generally in the STN-mode liquid crystal displaying device, rod-like liquid crystalline molecules in the liquid crystal cell are twisted at an angle of 90 to 360°, and product ($\Delta$nd) of anisotropy of refractive index ($\Delta$n) of the rod-like liquid crystalline molecules and cell gap (d) falls in the range from 300 to 1500 nm. An optical compensation sheet adoptable to the STN-mode liquid crystal displaying device may be produced according to the method described in JPA No. 2000-105316.

(VA-mode Liquid Crystal Displaying Device)

The cellulose acylate film of the present invention may advantageously be used as an optical compensation film or a support for an optical compensation sheet of a VA-mode liquid crystal displaying device having a VA-mode liquid crystal cell. The optical compensation sheet to be adopted to the VA-mode liquid crystal displaying device is preferably adjusted to have an Re value of 0 to 150 nm, and an Rth value of 70 to 400 nm. In the embodiments wherein two optically anisotropic polymer films are used for the VA-mode liquid crystal displaying device, the films preferably have an Rth value of 70 to 250 nm. In the embodiments wherein a single optically anisotropic polymer film is used for the VA-mode liquid crystal displaying device, the film preferably has an Rth value of 150 to 400 nm. The VA-mode liquid crystal displaying device may employ a multi-domain system as described typically in JPA No. H10-123576.

(IPS-Mode Liquid Crystal Displaying Device and ECB-Mode Liquid Crystal Displaying Device)

The cellulose acylate film of the present invention is advantageously used also as supports of optical compensation sheets, or as protective films of the polarizing plates, of an IPS-mode liquid crystal displaying device and an ECB-mode liquid crystal displaying device comprising an IPS-mode liquid crystal cell and an ECB-mode liquid crystal cell, respectively. These modes are characterized in that the liquid crystal materials are aligned almost horizontally with respect to the substrate in the black state. More specifically, the black state is obtained by allowing liquid crystal molecules to align horizontally with respect to the surfaces of the substrates in the absence of applied voltage. In these embodiments, the polarizing plates comprising the film of the present invention may contribute to improvement in color, expansion of viewing angle, and improvement in contrast. In these embodiments, the polarizing plate, comprising the film of the present invention as a protective film, is preferably disposed on either the upper or lower surface of the liquid crystal cell, so that the film is disposed between the polarizing film and the liquid crystal cell. It may be still more preferable to dispose an optically anisotropic layer between the protective film of the polarizing film and the liquid crystal cell, and retardation value of thus disposed optically anisotropic layer is adjusted to twice or less as large as $\Delta$n·d of the liquid crystal layer.

(OCB-mode Liquid Crystal Displaying Device and HAN-mode Liquid Crystal Displaying Device)

The cellulose acylate film of the present invention is advantageously adoptable also as supports of optical compensation sheets of an OCB-mode liquid crystal displaying device comprising an OCB-mode liquid crystal cell, or a HAN-mode liquid crystal displaying device comprising a HAN-mode liquid crystal cell. The optical compensation sheet used for the OCB-mode liquid crystal displaying device or the HAN-mode liquid crystal displaying device preferably has direction in which the absolute value of retardation value is minimized, not in the in-plane direction nor in the normal line direction of the optical compensation sheet. Also the optical characteristics of the optical compensation sheet used for the OCB-mode liquid crystal displaying device or the HAN-mode liquid crystal displaying device may be determined, depending on optical characteristics of the optically anisotropic layer, optical characteristics of the support, and positions of the optically anisotropic layer and the support. The optical compensation sheet adoptable to the OCB-mode liquid crystal displaying device or the HAN-mode liquid crystal displaying device may be produced, according to the method described in JPA No. H9-197397, or in a published paper by Mori et al. (Jpn. J. Appl. Phys., Vol. 38 (1999), p. 2837).

(Reflective Liquid Crystal Displaying Device)

The film of the present invention may advantageously be used also as the optical compensation sheets of TN-mode, STN-mode, HAN-mode and GH (Guest-Host)-mode reflective liquid crystal displaying devices. These display modes have been known. The TN-mode reflective liquid crystal displaying device may be produced according to the methods described in JPA No. H10-123478, International Patent WO98/48320 pamphlet, and Japanese Patent No. 3022477. The optical compensation sheet adoptable to the reflective liquid crystal displaying device may be produced according to the description of International Patent WO00/65384.

(Other Liquid Crystal Displaying Device)

The film of the present invention may advantageously be used also as the support of the optical compensation sheet of an ASM (Axially Symmetric Aligned Microcell)-mode liquid crystal displaying device having an ASM-mode liquid crystal cell. The ASM-mode liquid crystal cell is characterized in that thickness of the cell is kept by position-adjustable resin spacers. Other features are similar to those of the TN-mode liquid crystal cell. The ASM-mode liquid crystal cell and the ASM-mode liquid crystal displaying device may be produced according to the description of a published paper by Kume et al. (SID 98 Digest (1998), p. 1089).

EXAMPLES

The invention is described more concretely with reference to the following Examples. In the following Examples, the amount and the ratio of the material, the reagent and the substance used, and the operation may be suitably modified or changed not overstepping the sprit and the scope of the invention. Accordingly, the scope of the invention should not be limited to the following Examples.

1. Synthetic Examples

1.-1 Synthetic Example 1

Synthesis of Compound CA-1

In a 5 L-three-neck flask equipped with a mechanical stirrer, a thermometer, a condenser tube and a dropping funnel, 50 g of acetyl cellulose having a degree of substitution of 2.15 and 500 mL of pyridine were placed, and stirred at room temperature. In the flask, 114 mL of 4-heptyl benzoyl chloride (produced by Aldrich) was gradually and dropwise added to it, and after the addition, this was further stirred at 50° C. for 5 hours. After the reaction, this was left cooled to room temperature, and the reaction solution was poured into 10 L of methanol with vigorously stirring; and then a white solid deposited. The white solid was taken out through suction filtration, and washed three times with a large quantity of methanol. The obtained white solid was dried overnight at 60° C., and dried in vacuum at 90° C. for 6 hours to give 65 g of the intended compound, Compound CA-1, as a white powder. The mean degree of polymerization was 270.

1.-2 Synthetic Example 2

Synthesis of Compound CA-2

In the same manner as the synthesis of Compound CA-1, 64 g of Compound CA-2 was prepared as a white powder, except that 129 g of 4-heptoxybenzoyl chloride (produced by Wako Pure Chemical Industries, Ltd.) was used in place of 114 mL of 4-heptyl benzoyl chloride. The mean degree of polymerization was 272.

1.-3 Synthetic Example 3

Synthesis of Compound CA-3

1.-3-1 Preparation of p-dodecyl Benzoyl Chloride

In a 3 L-three-neck flask equipped with a mechanical stirrer, a thermometer, a condenser tube and a dropping funnel, 200 g of p-dodecyloxy benzoic acid (produced by Wako Pure Chemical Industries, Ltd.) and 300 mL of toluene were placed, and stirred at room temperature. In the flask, 240 g of thionyl chloride (produced by Wako Pure Chemical Industries, Ltd.) and 10 mL of dimethylformamide were gradually and dropwise added to it, and after the addition, this was further stirred at 80° C. for one hour. After the reaction, toluene and unreacted thionyl chloride were distilled away under reduced pressure; and then 190 g of a white solid of target p-dodecyloxy benzoyl chloride deposited.

1.-3-2 Synthesis of Compound CA-3

In the same manner as the synthesis of Compound CA-1, 69 g of Compound CA-3 was prepared as a white powder, except that 163 g of p-dodecyloxy benzoyl chloride was used in place of 114 mL of 4-heptyl benzoyl chloride. The mean degree of polymerization was 272.

1.-4 Synthetic Example 4

Synthesis of Comparative Compound CA-4

In the same manner as the synthesis of Compound CA-1, 61 g of Comparative Compound CA-4 was prepared as a white powder, except that 55 mL of benzoyl chloride was used in place of 114 mL of 4-heptyl benzoyl chloride. The mean degree of polymerization was 270.

1.-5 Synthetic Example 5

Synthesis of Compound CA-5

In the same manner as the synthesis of Compound CA-1, 63 g of Compound CA-5 was prepared as a white powder, except that an amount of 4-heptyl benzoyl chloride was changed from 114 mL to 49 mL. The mean degree of polymerization was 273.

1.-6 Synthetic Example 6

Synthesis of Compound CA-6

In the same manner as the synthesis of Compound CA-1, 62 g of Compound CA-6 was prepared as a white powder, except that an amount of 4-heptyl benzoyl chloride was changed from 114 mL to 47 mL. The mean degree of polymerization was 272.

1.-7 Synthetic Example 7

Synthesis of Compound CA-7

In the same manner as the synthesis of Compound CA-1, 62 g of Compound CA-7 was prepared as a white powder, except that 50 mL of 4-octyl benzoyl chloride (produced by Wako Pure Chemical Industries, Ltd.) was used in place of 114 mL of 4-heptyl benzoyl chloride. The mean degree of polymerization was 272.

1.-8 Synthetic Example 8

Synthesis of Compound CA-8

In the same manner as the synthesis of Compound CA-1, 61 g of Compound CA-8 was prepared as a white powder, except that an amount of 4-heptyl benzoyl chloride was changed from 114 mL to 44 mL. The mean degree of polymerization was 273.

1.-9 Synthetic Example 9

Synthesis of Comparative Compound CA-9

In the same manner as the synthesis of Compound CA-1, 62 g of Comparative Compound CA-9 was prepared as a white powder, except that 24 mL of toluoyl chloride (produced by Wako Pure Chemical Industries, Ltd.) was used in place of 114 mL of 4-heptyl benzoyl chloride. The mean degree of polymerization was 275.

1.-10 Synthetic Example 10

Synthesis of Comparative Compound CA-10

In the same manner as the synthesis of Compound CA-1, 60 g of Comparative Compound CA-10 was prepared as a white powder, except that 22 mL of benzoyl chloride was used in place of 114 mL of 4-heptyl benzoyl chloride. The mean degree of polymerization was 275.

1.-11 Synthetic Example 11

Synthesis of Compound CA-11

In the same manner as the synthesis of Compound CA-1, 60 g of Compound CA-11 was prepared as a white powder, except that an amount of 4-heptyl benzoyl chloride was changed from 114 mL to 44 mL. The mean degree of polymerization was 273.

1.-12 Synthetic Example 12

Synthesis of Comparative Compound CA-12

In the same manner as the synthesis of Compound CA-1, 60 g of Comparative Compound CA-12 was prepared as a white powder, except that 20.5 mL of benzoyl chloride was used in place of 114 mL of 4-heptyl benzoyl chloride. The mean degree of polymerization was 275.

1.-13 Synthetic Example 13

Synthesis of Compound CA-13

In the same manner as the synthesis of Compound CA-1, 53 g of Compound CA-13 was prepared as a white powder, except that an amount of 4-heptyl benzoyl chloride was changed from 114 mL to 32 mL. The mean degree of polymerization was 273.

1.-14 Synthetic Example 14

Synthesis of Comparative Compound CA-14

In the same manner as the synthesis of Compound CA-1, 50 g of Comparative Compound CA-14 was prepared as a white powder, except that 16 mL of benzoyl chloride was used in place of 114 mL of 4-heptyl benzoyl chloride. The mean degree of polymerization was 275.

2. Examples

2.-1 Example 1

Production of Cellulose Acylate Film

Using the cellulose acylate shown in the following table, cellulose acylate films were produced according to the method mentioned below.

2.-1-1 Preparation of Cellulose Acylate Solution

The following materials were put into a mixing tank, and stirred under heat and dissolved to prepare a cellulose acylate-containing solution.

Cellulose acylate shown in Table below 100 mas.pts.

Methylene chloride (first solvent) 402 mas.pts.

Methanol (second solvent) 60 mas.pts.

2.-1-2 Production of Cellulose Acylate Film Sample

Each cellulose acylate solution was cast on a band, using a band caster to form a film. The film having a residual solvent content of 15% by mass was subjected to a fixed-edge monoaxial stretching with a stretching ratio shown in the table at a temperature of Tg+15° C. to form each of cellulose acylate films shown in the table. Unless otherwise specifically indicated in the following description, the thickness of each film produced was all 80 μm.

2.-1-3 Evaluation of Cellulose Acylate Film Sample

Each of the film samples was evaluated as follows: A part (120 mm×120 mm) of each film sample obtained in the above was prepared. Using "KOBRA 21ADH" (by Oji Scientific Instruments), Re and Rth of the sample piece at a wavelength of 590 nm were measured. The results are shown in the following Table.

In addition, the difference between Re values at 590 nm which were measured at 25° C. and 80% RH at 25° C. and 10% RH respectively, ΔRe, was determined; and the difference between Rth values at 590 nm which were measured at 25° C. and 80% RH at 25° C. and 10% RH respectively, ΔRth, was determined. The results are shown in the following Table.

TABLE 1

| Film No. | Cellulose Acylate No. | Substituent A | DSA2 + DSA3 | DSA6 | DSA2 + DSA3 − DSA6 | DSB | DS | Ratio (%) *1 | Rth (nm) | Re (nm) | ΔRth (nm) | ΔRe (nm) | Note *2 |
|---|---|---|---|---|---|---|---|---|---|---|---|---|---|
| F-1 | CA-1 | 4-heptyl benzoyl | 0.50 | 0.35 | 0.15 | 2.15 | 3.0 | 60 | −50 | 320 | 2 | 6 | I |
| F-2 | CA-2 | 4-heptoxy benzoyl | 0.50 | 0.35 | 0.15 | 2.15 | 3.0 | 60 | −120 | 180 | 5 | 10 | I |
| F-3 | CA-3 | 4-dodecylox benzoyl | 0.50 | 0.35 | 0.15 | 2.15 | 3.0 | 90 | −131 | 240 | 2 | 3 | I |
| F-4 | CA-4 | benzoyl | 0.50 | 0.35 | 0.15 | 2.15 | 3.0 | 5 | −190 | 50 | 15 | 19 | C |
| F-5 | CA-5 | 4-heptyl benzoyl | 0.30 | 0.35 | −0.05 | 2.15 | 2.80 | 60 | −10 | 250 | 9 | 15 | I |
| F-6 | CA-6 | 4-heptyl benzoyl | 0.25 | 0.35 | −0.10 | 2.15 | 2.75 | 60 | 2 | 210 | 7 | 13 | I |
| F-7 | CA-7 | 4-octyl benzoyl | 0.25 | 0.35 | −0.10 | 2.15 | 2.75 | 70 | −25 | 200 | 9 | 11 | I |
| F-8 | CA-8 | 4-heptyl benzoyl | 0.20 | 0.35 | −0.15 | 2.15 | 2.70 | 60 | −30 | 190 | 8 | 12 | I |
| F-9 | CA-9 | 4-toluoyl | 0.25 | 0.35 | −0.10 | 2.15 | 2.75 | 30 | −100 | 8 | 33 | 24 | C |
| F-10 | CA-10 | benzoyl | 0.25 | 0.35 | −0.10 | 2.15 | 2.75 | 30 | −110 | 3 | 35 | 25 | C |
| F-11 | CA-11 | 4-heptyl benzoyl | 0.15 | 0.35 | −0.20 | 2.15 | 2.65 | 45 | 250 | 4 | −1 | 15 | I |
| F-12 | CA-12 | benzoyl | 0.15 | 0.35 | −0.20 | 2.15 | 2.65 | 30 | 120 | 40 | 25 | 42 | C |
| F-13 | CA-13 | 4-heptyl benzoyl | 0 | 0.35 | −0.35 | 2.15 | 2.50 | 45 | 92 | 432 | 11 | 23 | I |
| F-14 | CA-14 | benzoyl | 0 | 0.35 | −0.35 | 2.15 | 2.50 | 30 | 40 | 270 | 30 | 45 | C |

*1: Maximum stretching ratio (%)
*2: "I" indicates an example of the invention; and "C" indicates a comparative example.

From the results shown in the above table, it is understandable that, the monoaxial-stretching treatment was carried out on each of the cellulose acylate films of Examples of the invention successfully, and that each of stretched films to F-3, F-5 to F-8, F-11 and F-13) show various Re and Rth depending on the stretching ration. It is also understandable that, according to the invention, a cellulose acylate film, having various Re and Rth, can be obtained by using cellulose acylate which has various Substituent A and various degree of substitution with Substituent A.

It is also understandable that all of the cellulose acylate films of Examples of the invention showed small retardation-variation, ΔRe and ΔRth, depending on humidity-variation, and that ΔRe and ΔRth values of Examples of the invention were remarkably smaller than those of the cellulose acylate film which was prepared by using cellulose acylate having benzoyl or toluoyl in place of Substituent A.

What is claimed is:

1. A cellulose acylate film comprising a cellulose acylate having at least one substituent (Substituent A) comprising an aromatic group having at least one $C_4$ or longer aliphatic group.

2. The cellulose acylate film of claim 1, being a stretched film.

3. The cellulose acylate film of claim 1, wherein the cellulose acylate further has at least one aliphatic acyl group (Substituent B).

4. The cellulose acylate film of claim 3, wherein a substitution degree with Substituent B, DSB, satisfies following relational expression (I):

$$1.70 \leq DSB \leq 2.89. \tag{I}$$

5. The cellulose acylate film of claim 3, wherein Substituent B is a $C_{2-4}$ aliphatic acyl group.

6. The cellulose acylate film of claim 5, wherein Substituent B is an acetyl group.

7. The cellulose acylate film of claim 1, being a retardation film.

8. An antireflection film comprising a cellulose acylate film as set forth in claim 1, and an antireflection layer.

9. A polarizing plate comprising a polarizing film, and two protective films having the polarizing film therebetween, wherein at least one of the two protective films is a cellulose acylate film as set forth in claim 1.

10. An image-displaying device comprising a cellulose acylate film as set forth in claim 1.

* * * * *